United States Patent [19]

Hall et al.

[11] Patent Number: 4,611,606
[45] Date of Patent: Sep. 16, 1986

[54] FEEDING ARRANGEMENT FOR AN AXIAL FLOW ROTARY SEPARATOR

[75] Inventors: James W. Hall, Bettendorf, Iowa; Maurice A. Popelier, Moline, Ill.

[73] Assignee: Deere & Company, Moline, Ill.

[21] Appl. No.: 646,349

[22] Filed: Aug. 29, 1984

[51] Int. Cl.⁴ .............................................. A01F 7/06
[52] U.S. Cl. .................................... 130/23; 130/27 T
[58] Field of Search .............. 130/23, 27 T, 30 H, 130/27 R; 56/14.6

[56] References Cited

U.S. PATENT DOCUMENTS

| | | | |
|---|---|---|---|
| 3,122,499 | 2/1964 | Witzel et al. | 209/21 |
| 3,315,449 | 4/1967 | Morrison et al. | 56/21 |
| 3,536,077 | 10/1970 | Scott et al. | 130/6 |
| 3,613,691 | 10/1971 | Wilshusen | 130/23 |
| 3,794,046 | 2/1974 | Muijs | 130/27 T |
| 3,794,047 | 2/1974 | DeCoene et al. | 130/27 T |
| 4,149,543 | 4/1979 | DeCoene et al. | 130/23 |
| 4,178,942 | 12/1979 | Nusser | 130/23 |
| 4,180,081 | 12/1979 | Shaver | 130/27 R |
| 4,367,757 | 1/1983 | Claas | 130/27 T |
| 4,408,618 | 10/1983 | Witzel | 130/23 |

FOREIGN PATENT DOCUMENTS

219311  5/1968  U.S.S.R. .

Primary Examiner—Jay N. Eskovitz

[57] ABSTRACT

The axial flow rotary separator of a self-propelled combine employs dual side-by-side rotors sharing a common infeed opening. Finger-like crop engaging elements of the rotors are propelled in orbits both oblique and eccentric with respect to the separator casings. The rotors are counter rotating and a stream of threshed crop material is delivered towards the bite of the rotors so that it is carried through between the rotors and divided against an opposite floor of the infeed casing. The fingers are disposed so that, as the rotor rotates, the degree of engagement of each finger with the crop material stream varies and so that, while in its principal engagement with the material, each finger propels portions of the crop material stream generally spirally downstream.

26 Claims, 13 Drawing Figures

FEEDING ARRANGEMENT FOR AN AXIAL FLOW ROTARY SEPARATOR

CROSS REFERENCES TO RELATED APPLICATIONS

U.S. patent application Ser. No. 646,393 filed simultaneously herewith in the name of West et al, entitled ROTOR FOR AN AXIAL FLOW ROTARY SEPARATOR and assigned to the assignee of the invention herein, is directed in a preferred embodiment to a tined separator rotor in which the tines are mounted for oblique and eccentric rotation with respect to the separator casing axis and each tine or finger is individually journalled. To the extent that the invention disclosed and claimed in application Ser. No. 646,393 is disclosed herein, it is done so only for completeness of description of the operative environment of the invention claimed herein and thus forms no part of the invention claimed herein.

U.S patent application Ser. No. 646,346 filed simultaneously herewith in the name of Hall et al, entitled AXIAL FLOW ROTARY SEPARATOR and assigned to the assignee of the invention herein, is directed in a preferred embodiment to an axial flow rotary separator in which axial displacement of crop material depends on helical guide surfaces in the separator casing while finger-like elements of the rotor provide circumferential propulsion but are free to deflect downstream to facilitate the flow of crop material through the separator. To the extent that the invention disclosed and claimed in application Ser. No. 646,346 is disclosed herein, it is done so only for completeness of description of the operative environment of the invention claimed herein and thus forms no part of the invention claimed herein.

BACKGROUND OF THE INVENTION

This invention concerns axial flow rotary separators of the type used principally in combine harvesters and particularly the feeding of separators in which the rotor includes axially displaceable crop engaging elements.

Although the long history of threshing and separating of agricultural grain crops has been dominated by the conventional arrangement of transverse threshing cylinder upstream of a rack or straw walkers, there have also been attempts, spanning many years, to develop axial flow rotary separation. In recent years, combine harvesters embodying this principle have captured a significant portion of the market.

Until the recent disclosure of Witzel (U.S. Pat. No. 4,408,618), all known axial flow rotary separators with driven rotors depended for axial indexing on relative motion or slippage between the crop material and angled surfaces within the separator such as angled blades on the rotor or helical guide vanes on the casing or a combination of the two. Ideally, in such separators, the crop material is deflected along the generally radially extending surfaces of the blades or guide vanes but, inevitably there is some radially outward migration of material into the annular clearance space between rotor extremities and casing. Overall, there are very high friction losses, specific power consumption is high and handling of some types of material is unreliable. For example, in damp material, there may be a tendency to "roping" of the material, leading to plugging of the separator.

Nusser (U.S. Pat. No. 4,178,942) has proposed a modification of the conventional axial flow rotary separator, substituting more or less randomly oscillating tines for the fixed crop engaging elements of conventional rotors and relying entirely on helical guide vanes for axial propulsion. The intermittently engaging, positively propelling and "spirally moving" crop-engaging elements of Witzel's rotor makes guide vanes unnecessary and dramatically cuts the specific power requirement while improving material handling characteristics and maintaining an acceptable level of separating efficiency.

The feeding of axial flow rotary separators presents special difficulties especially when the direction of flow of the delivered material is generally parallel to the rotor axis. A flow of material moving generally linearly and converging on the rotor axis must be engaged by the rotor and transformed into an annular mat moving spirally downstream in the annular space between rotor and casing. The separating (and threshing when included) function depends on fairly high rotational speed in the rotor so that obviously a simple rotor tends to repel, centrifugally, material offered to it. The patent literature of recent years presents abundant evidence of this problem and the attempts to overcome it. In general, the feed and/or transition portions of separator rotors have relied on a screw conveyor-like form and abruptly tapering and confining housings to force incoming material through the transition from linear stream to spirally moving annular mat. Tangential feeding (as in U.S. Pats. No. 3,315,449 Morrison or U.S. Pat. No. 4,180,081 Shaver for example) may be smoother but the tangential configuration is not always convenient and its efficiency is still subject to the limitations of the fixed element rotor. (Tangential feeding may be convenient or appropriate in dual rotor machines where side-by-side rotors share a common housing and are driven in the same direction, as disclosed for example in Russian patent No. 219 311 and U.S. Pat. No. 4,367,757, Claas).

The screw conveyor form of feed rotor is also and typically used in twin side-by-side or dual rotor separators of the type where, beyond the infeed portion, each rotor operates independently, in its own casing. In general purpose combines with separators designed to handle a wide range of crops, including small grains and corn, the material handling characteristics of the feed rotor forms employed (fixed element) and the need to divide the flow as evenly as possible between the two rotors has dictated that the rotors be contrarotating and that their direction of rotation be such as to repel incoming material directed towards the space between the rotors. The incoming stream is divided therefore and diverted laterally outwards and typically upwards into the infeed housing and the beginning of the annular space between rotor and casing. This method of flow-dividing is imprecise and inefficient even when supplemented by upstream dividing elements such as "knives" in the combine feeder house (see for example U.S. Pat. No. 3,794,046 Muijs and U.S. Pat. No. 3,794,047 DeCoene).

In some known twin rotor corn shellers embodied in self-propelled harvesters, direction of rotation is opposite to that just described so that material directed to the space between the rotors and satisfactorily engaged is drawn between the rotors rather than repelled (see U.S. Pat. No. 3,536,077 Stott). This arrangement may be satisfactory in a single crop machine such as the self-propelled corn harvester/sheller where it is feasible to gravity feed the rotors and the physical nature of the crop does not require high rotor speed or a particularly agressive rotor feed portion Witzel's disclosure (U.S. Pat. No. 4,408,618) is directed almost exclusively to the structure and function of his rotor as a separating rotor, successful feeding of the separator having been assumed. Witzel comments that a rotor with crop material engaging elements according to his inventive principle might function well in a separator feed section but he makes no specific suggestions for configuration or arrangement of the feed section.

SUMMARY OF THE INVENTION

Accordingly, it is an object of the present invention to provide an axial flow rotary separator which receives crop material and conveys it into the specific functional zone of the separator (threshing or separating) reliably and efficiently, with a minimum specific power demand. It is a further object to adapt the principle of the intermittently engaging, positively propelling and axially displaceable rotor element, to the infeed portion of the separator.

For convenience, crop material engaging elements arranged to penetrate and engage a crop material flow only intermittently will often be referred to below as "fingers" or "finger-like elements" although, of course, the elements may take many forms while still functioning in essentially the same way.

In keeping with the invention, inlet conditions are provided which encourage the penetration and engagement of incoming crop material by finger-like crop material engaging elements of the rotor so that, soon after engagement, the crop material is in contact with and being guided circumferentially by separator casing portions and already being urged in a spiral path downstream.

In a multiple rotor machine, including at least one pair of side-by-side contrarotating rotors, an incoming stream of material may be directed into an open receiving zone between a pair of rotors. The direction of rotation of the rotors and spacing of the crop material engaging elements may be such as to create a "bite" so that the incoming crop material is agressively engaged and carried through between the rotors towards an infeed wall or baffle surface, generally transverse of the rotors. After passing through "dead center" of the bite, the crop material engaging elements will begin to diverge (as they approach the baffle wall), dividing the flow of crop material with a combing action. The baffle wall may be contoured somewhat into this dividing zone but any such intrusion should be limited so as to leave substantial "breathing" space between the diverging rotor elements and the baffle wall, so that division of the stream of material may proceed freely and to maximize the tendency of the arrangement to divide the crop material into two substantially equal portions. The dividing of the material flow tends to be self-equalizing because of the centrally confined splitting zone defined by the diverging paths of the fingers and the infeed wall. This desirable division is thus achieved without the imposition of friction generating, power consuming, or flow impeding, passive dividers or splitters.

According to the invention, the infeed arrangement of moving rotor elements and fixed casing portions includes means effective, after the material is in contact with the casing and being guided substantially circumferentially by suitably shaped casing wall portions to urge at least the radially outward portions of the crop material engaging elements axially downstream so that, as the rotor rotates, each portion of crop material flow while in engagement, may be indexed axially downstream.

In a preferred embodiment, means within the rotor assembly itself cause the radially outward portions of the crop engaging elements to be displaced axially downstream while in the principal zone of engagement with the crop material. Helically disposed guide vanes in the separator feed portion casing may also be used to assist in axial indexing and may substantially parallel the path followed by the fingers while they are in the principal zone of engagement of the fingers with the crop material.

Preferably, in the feed section of a dual rotor separator, the "bite" of the rotors is completely exposed and open to incoming material. The spacing between the rotor axes may be little more than half the sum of the swept diameters of the individual feed rotor portions so that the incoming flow of material is almost completely penetrated by the fingers entering from its opposite sides. Rotors with a relatively sparse population of fingers may be used and in some applications, rotor diameter may be such that there is actually overlapping radial penetration of fingers within the crop material incoming flow.

In dual rotor arrangements, optimization of function in the respective feed and separating portions may require greater tip clearance between fingers of the side-by-side rotors in the fully enclosed separator sections than in the open feed section. To permit the use of coaxial rotors and a casing of regular cylindrical form, including a partial extension into the infeed area rotor, axes may be spaced to suit infeed function at their forward ends and then diverge rearwardly into the separator sections. Alternatively, the rotor feed portion may be of greater diameter than the separator portion while axes remain parallel. Another method of reconciling the different requirements of the feeding and separating functions is to use different directions and/or degrees of eccentricity of the respective feed and separator rotor portions with respect to their casings. (Successful function of the penetrating finger-type rotor depends on intermittent engagement of the finger with the crop mat, typically achieved by mounting the rotor axis eccentrically within a generally cylindrical casing.)

When rotor portion diameters are stepped, or when rotor axes are offset between feed and separating sections, a particular transition configuration in the casing helps to control the flow of material from the feed section into the confines of the separator casing proper.

It is a feature of the invention that in a dual rotor arrangement, the inlet area to the feeding zone is completely open and there is no need for, or particular benefit to be gained from, attempting to center the flow of material or initiate its division before it is engaged by the bite of the rotor feed portions. It is necessary only that an inlet casing opening offers generous access to the feed rotor bite. Preferably, then, the inlet casing will include walls extending circumferentially from the baffle wall (described above) to partially wrap the respective feed rotor portions and terminate on the opposite side of the rotors from the baffle wall, cooperating to define the lateral extent of the inlet opening. This wrapping or cylindrical surface portion of the inlet casing walls provides a guide surface in cooperation with which the rotor feed portion initiates the downstream spiral path of the crop material. In the feed section, the respective rotor feed portion axes are so disposed and the configuration of the inlet casing wrapping portion is such that radial clearance between the rotor fingers and the casing is greater in the zone rotationally adjacent the inlet opening than in the zone rotationally adjacent the baffle wall. Thus, soon after initial engagement and having passed through the bite, a crop material portion is under close control by a finger or fingers against the casing wall and axial indexing is initiated. But after about one half revolution of the rotor, the finger has diverged radially from the casing wall so that the finger may release the crop material. A preferred feeding configuration, with respect to effective lead of the axial indexing means and the axial extent of the inlet opening, results in any given portion of the crop material flow passing from the feed portion into the separating portion within little more than one revolution in the casing following its engagement by the fingers.

Another feature of the invention is its insensitivity to the angle of approach of the incoming stream of crop material. Reference was made above to some parameters of the lateral and axial extent of an inlet opening with respect to the rotor feed portions. In any case, the opening may be positioned for substantially undershot or overshot presentation of crop material conveyed from the harvester gatherer. The angle of approach of the incoming stream of material with respect to the rotor axes may be varied over a very wide range with little effect on feeding efficiency.

The embodiments referred to above have all involved at least one pair of cooperating side-by-side rotors. The invention may also be embodied in a single rotor arrangement where the axial indexing function is essentially as described above. There is of course, no flow dividing function but at least one substantially tangential guide surface may be used to direct the incoming flow of material into engagement with the rotor.

BRIEF DESCRIPTION OF THE DRAWINGS

FIG. 5b is a schematic representation taken on line 5b—5b of FIG. 3 of the motion of one of the rotor fingers of FIG. 5a.

FIG. 5c is a simplified schematic representation of a view similar to FIG. 5a of the swept path of one of the fingers of the separator rotor infeed portion shown in FIG. 5a.

DESCRIPTION OF THE PREFERRED EMBODIMENT

Figure 1:
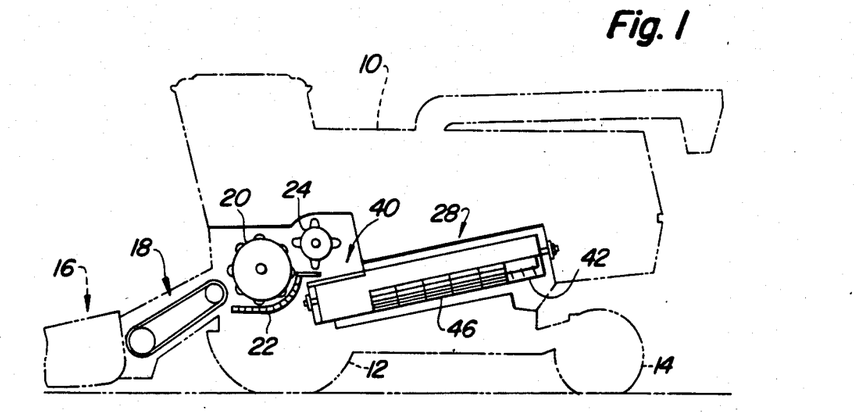
FIG. 1 is a simplified semi-schematic side elevation of a dual rotor feeding and separating arrangement according to the invention installed in a self-propelled combine harvester, the body of the harvester being shown only in phantom outline.

The invention is embodied in a self-propelled combine with a configuration as indicated in phantom outline only in FIG. 1. Apart from the separator, and particularly its feeding arrangements which form the subject of the invention, the combine is largely conventional. A body 10 is carried on forward drive wheels 12 and steerable rear wheels 14. As the machine advances, gathered crop material is transferred by a feederhouse conveyor 18 for threshing by a cylinder and concave, 20 and 22, respectively, and generally rearward delivery by a beater 24, cooperating with a finger bar grate 26, to a separator 28. Typically, the combine body 10 would also carry a cleaning mechanism for receiving separated grain from the separator 28 but this is not shown in the drawings. In the following description, left- and right-hands are as perceived by an observer standing behind the machine and facing forward.

Looking now at the separator 28 in more detail, and with particular reference to FIGS. 1-4, the separator is of the axial flow rotary type employing a pair of rotors, side-by-side with their axes parallel and extending generally fore-and-aft and approximately horizontal. The rotors are of the positive propulsion, intermediate engagement type described in detail in U.S. Pat. No. 4,408,618, Witzel, hereby incorporated by reference. The principles of operation of such separator rotors are further referred to below, for example, with reference to FIGS. 5b and 5c.

Figure 2:
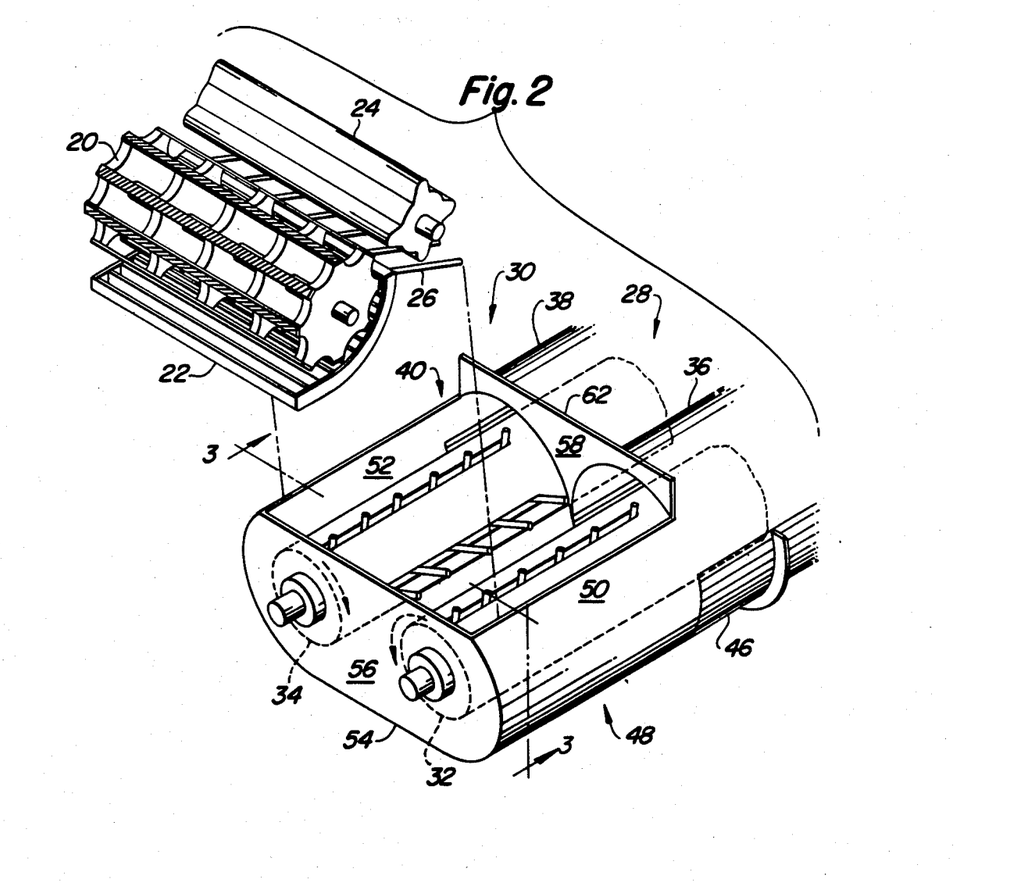
FIG. 2 is an enlarged three-quarter left front perspective exploded view of the threshing mechanism and the infeed portion of the separator.
Figure 3:
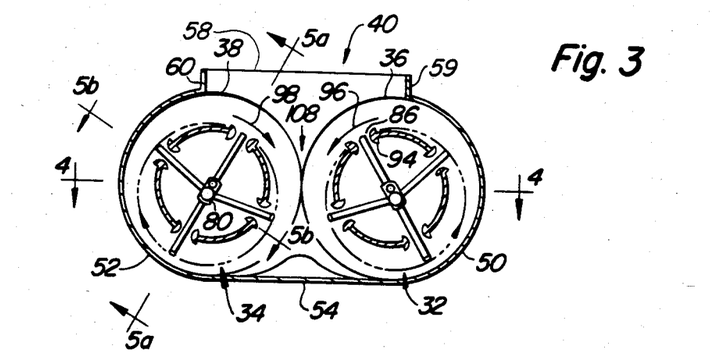
FIG. 3 is a cross section of the infeed portion of the separator taken approximately on line 3—3 of FIG. 2.
Figure 4:
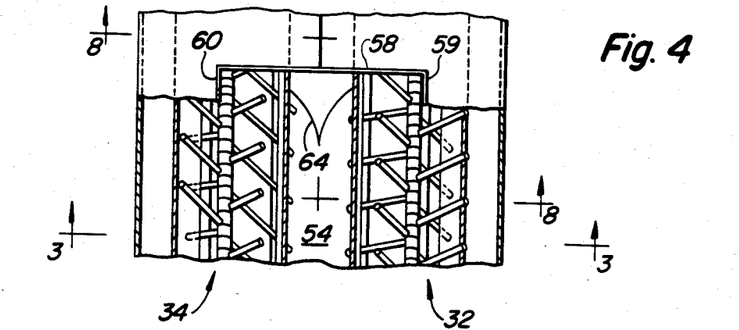
FIG. 4 is a partial overhead view, partially cut away, of the infeed portion of the separator.

The principle components of the separator are a casing assembly 30, constructed largely of sheet metal and a pair of side-by-side rotors, 32 left-hand and 34 right-hand. The basic form of the casing assembly 30 is a pair of contiguous hollow cylinders 36 and 38, respectively, the cylindrical walls of which are cut away in the forward infeed portion to define a generally rectangular upwardly opening inlet 40. Each casing portion 36, 38 has a downstream outlet 42, 44 (only the left-hand outlet 42 is shown in the drawings). Foramina 46 in the casings between the inlet 40 and the outlets 42, 44 permit separated grain to pass outwards through the cylindrical walls for reception by cleaner conveyors (not shown).

The infeed portion 48 of the casing is in the form of an open box with opposite left- and right-hand sidewalls 50 and 52, respectively, each comprising an outer approximately semi-cylindrical wall portion remaining after "cutting away" the respective basic cylinders 36, 38. Floor 54 is tangential with the respective sidewalls 50, 52. Front and rear transverse bulkheads or walls 56 and 58, respectively, complete the basic definition of the feed casing 48. Connecting and deflecting surfaces may be used as appropriate to help guide crop material from the beater 24 into the inlet 40 but in the drawings, these are suggested only by upward extensions of the casing, lips 59 and 60 on the sidewalls 50 and 52, respectively (FIG. 3), and an upward extension 62 of the rear bulkhead 58. The bulkhead 58 essentially embraces only the upper halves of the cylindrical casing portions 36 and 38. A symmetrical fairing 64 makes the transition between the floor 54 and the lower inner quadrants of the cylindrical casing portions 36, 38 (seen best in FIG. 4).

Figure 5A:
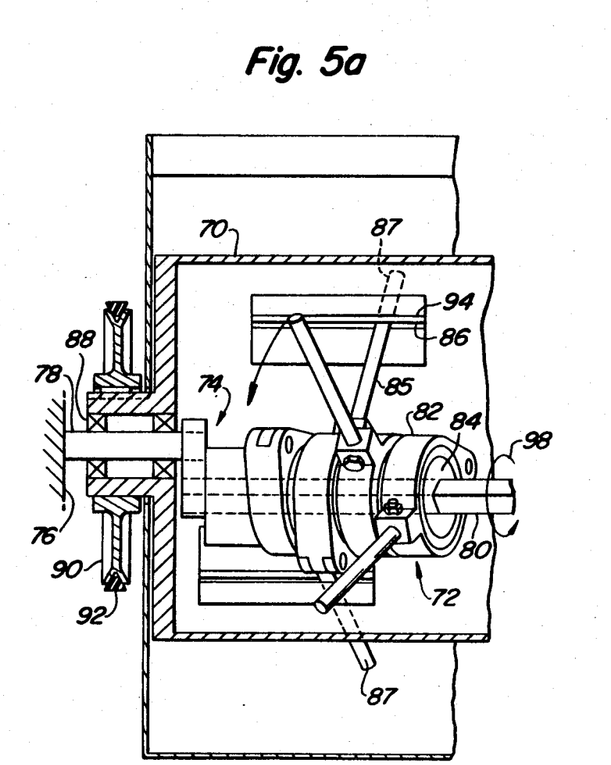
FIG. 5a is a partially sectioned view taken on line 5a—5a of FIG. 3 of a forward infeed portion of the right-hand separator rotor.
Figure 5B:
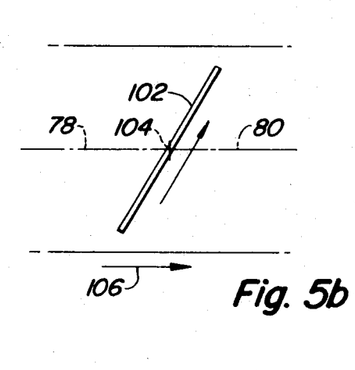
Figure 5C:
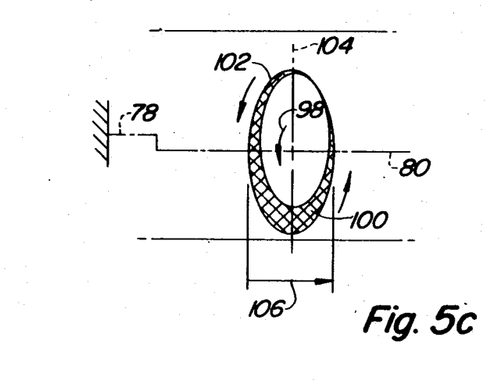

The general construction of a rotor is seen best in FIG. 5a, a partial view of a forward portion of the right-hand rotor 34. (The left-hand rotor 32 is similar but of opposite hand.) The basic functional components of the rotor are a cage or drum 70 and a series of individually journaled finger assemblies 72, all supported by a fixed cranked shaft 74. The shaft 74 is supported by frame members of the combine body 10 such as the frame member portion 76 shown in FIG. 5a. The cranked shaft is made up of coaxial portions such as forward portion 78, carried by frame member 76, all coaxial or concentric with the casing cylindrical portions 36 or 38, respectively, and a finger support portion 80, offset downwards and outwards at an angle of about 30 degrees from the vertical. The finger assemblies 72 each include a hub portion 82 journalled obliquely on a bearing block 84 carried nonrotatably on the shaft portion 80 and a radially extending finger 85, each finger having a crop engaging portion or tip 87 and passing through a longitudinally extending slot 86 in the drum 70. The drum is journalled by bearings such as bearings 88 on the coaxial shaft portion 78 and driven by sheave 90 connected by V-belt 92 to a power source on the combine (not shown). The edges of the drum slots 86 may be protected by wear pads 94. Direction of rotation of the rotor is indicated by arrows 96, 98.

Discussion of operation will concentrate on feeding the separator. Delivery of material to the inlet 40 is, as described above, essentially conventional. And, as also mentioned above, U.S. Pat. No. 4,408,618, Witzel describes in detail, the function of the intermittently engaging, positively propelling finger rotor within a cylindrical separator casing. However, before discussing the characteristics of the separator infeed arrangement as a whole, it is convenient to recapitulate the behavior of an individual crop-engaging element (radially outward finger portion 87), rotationally driven by the drum 70 and eccentrically and obliquely orbiting with respect to the concentric cylindrical casing portion 52 (and 38)—with particular reference to FIGS. 5b and 5c.

Efficient functioning of the intermittent or variable engagement finger rotor depends on maintenance of the crop material being handled substantially in an annular mat generally in contact with the inner surface of the separator casing. This is achieved principally by maintaining rotational speed so that the crop material mat remains generally in contact with the casing (52, 38) under the action of centrifugal force. The outer surface of the drum (70) may also play a part in maintaining the mat configuration. The eccentric arrangement of the fingers with respect to the separator casing, results, of course, in variable or intermittent largely radial penetration of the mat by the tip of the finger 87. Periodic total disengagement of any individual finger from the mat may be ensured by arranging drum and finger dimensions so that, at least for a short part of the cycle, each finger tip 87 is withdrawn down to or below the surface of the drum 70. The general "shape" of the varying engagement of a finger is indicated by the shaded area 100 in FIG. 5c where the inner ellipse corresponds to the surface of the drum 70 and the outer ellipse (102) is the periphery of the path of the finger tip 87.

In the present arrangement, axial displacement or spiral propulsion downstream of the crop material depends entirely on the crop-engaging elements or fingers of the rotor. Obviously then, the plane of rotation of the finger must be chosen so that the net effect of finger engagement with the mat is to index it downstream. For simplicity of discussion, it will be assumed that each finger is in effective engagement with the crop material mat for one half revolution or 180 degrees. The following simple sequence may be used to "position" the plane of finger wheel rotation with respect to the separator longitudinal axis (center line of a generally cylindrical casing) so as to achieve the desired indexing effect. Direction of rotation is as indicated by arrow 98.

1. The finger support shaft 80 is cranked or offset in the desired direction—in this case, downwards and outwards at approximately 30 degrees from the vertical with respect to the casing center. (Successful operation has been achieved with this disposition—i.e., with the center of the zone of maximum finger engagement displaced somewhat outwards and upwards.)

2. The plane of rotation or disk 102 described by the motion of the finger 85 is first "placed" on the finger support shaft 80 in a plane perpendicular to the axis of the separator.

3. Now, viewing the finger plane of rotation 102, from a side of the separator casing remote from the zone of maximum engagement (i.e. from above in our example), the disk is "steered" downstream (see FIG. 5b). That is to say, the finger disk 102 is rotated about an axis 104, lying within the plane defined by the cranked shaft 74 and perpendicular to the longitudinal axis of the separator, in a direction such that the axial displacement 106 of the finger tip 87, while in most effective engagement, is downstream.

It should be noted that the configuration just described results in the maximum possible axial indexing effect for a given direction of rotation and angularity of the finger disk of rotation (102) with respect to the axis of the separator. As described by Witzel, the net axial indexing effect may be varied through a range from maximum upstream to maximum downstream by, as it were, fixing the axis of rotation of the finger with respect to the shaft finger support portion 80 and then rotably adjusting that shaft about its own axis through 180 degrees. Now, to consider the cooperative operation of the twin rotors 32 and 34 and the feed casing 48, it is assumed that, as indicated in the drawings, the left-hand rotor 32 is also configured for downstream indexing in a similar manner to that just described for the right-hand rotor 34. Crop material is delivered generally downward from the beater 24 into the infeed casing inlet 40. The sides of the inlet opening, defined by lips 59 and 60, respectively, are approximately above top dead center of the rotors so that material engaged by the rotors 32, 34 is immediately drawn inwards and downwards towards the bite 108 between the rotors (FIG. 3). The engagement of the finger tips 87 with the crop material is progressively increasing (by virtue of the eccentricity of the axis of finger rotation with respect to the drums 70). Having passed through the bite 108, the fingers, with a pulling action, effectively divide the flow of crop material, to some extent assisted by the floor 54 which immediately opposes the downward flow of the material. Each rotor then, with its fingers in maximum radial engagement of the mat and in its zone of maximum downstream axial displacement, continues a downstream spiral propulsion of the crop material mat while in the lower outward half of the casing.

Circumferential propulsion and movement of the mat continues in the upper outer quadrants of the casing but, of course, the fingers by now are less engaged and have little axial indexing effect. However, the net effect for the one revolution of the mat has been a substantial downstream indexing.

Much of the received material is propelled downstream and into the upstream end of the separator proper (cylindrical casing portions 36 and 38) after approximately one revolution with the rotor. Material which is carried over within the inlet 40 is combined with the stream of incoming material which, assisted by the "grabbing" effect of the converging rotors at the bite 108, ensures the continuation of smooth and positive feeding of material into the casings 36, 38 where separation of the crop material continues.

Figure 6:
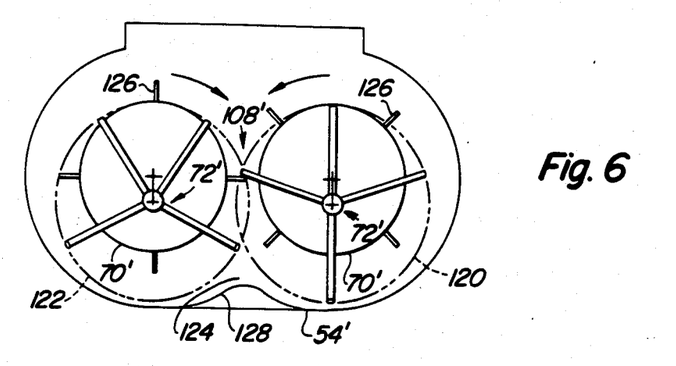
FIG. 6 is a view similar to FIG. 3 of an alternative embodiment of the invention in which the cylinders of revolution generated collectively by the fingers as the rotors rotate intersect.
Figure 7:
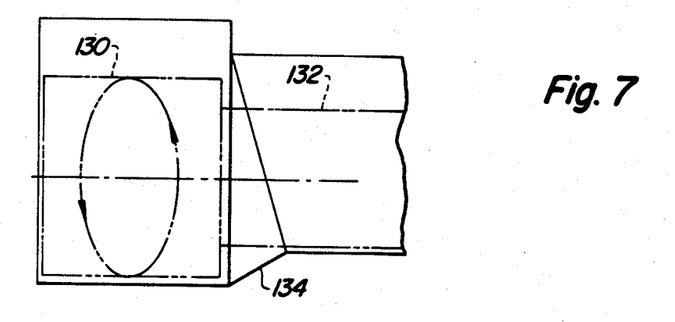
FIG. 7 is a simplified schematic side elevation of the forward portion of a dual rotor separator including a feed portion having a particular alternative embodiment of the invention in which the overlapping infeed rotors of FIG. 6 are associated with separator rotors of lesser diameter.
Figure 8:
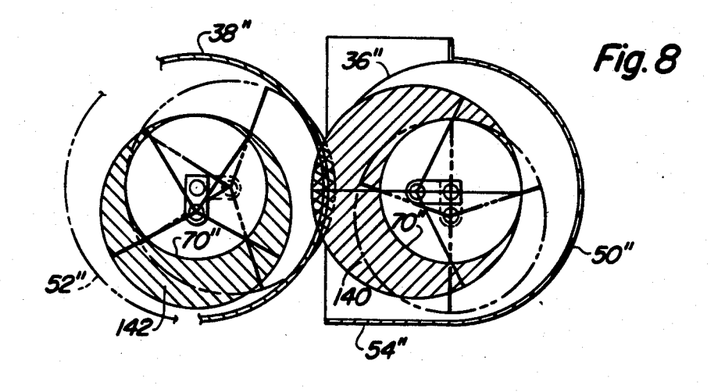
FIG. 8 is a view similar to FIGS. 3 and 6 and similar to a view taken on line 8—8 of FIG. 4 of a further alternative embodiment in which the overlapping of rotors in the infeed portion is achieved by a particular arrangement of the respective infeed and separator rotor portion crank offsets.

Feeding efficiency may be enhanced by meshing the feed rotor portions of the separator as illustrated in FIG. 6. In this arrangement the eccentricity of the axis of rotation of the finger assemblies 72' with respect to the rotor drums 70' is vertically downwards and the center distance of the feed rotor portions is less than that of the surfaces of revolution 120, 122 generated by rotation of the rotor feed portions so that the surfaces of revolution intersect at the bite 108'. This arrangement increases the aggressiveness of the rotor fingers in the bite zone 108' and also in the "splitting" area 124 immediately below it. The agressiveness or positive feeding of the rotors may also be increased by longitudinal paddles or blades 126 carried by the drums 70'. Some contouring of the feed casing floor 54' into the splitting zone 124 as indicated at 128 in FIG. 6 may also be used to optimize the splitting and dividing effect of the rotors FIGS. 7 and 8 illustrate two preferred configurations of separator rotor for dual rotor separators which achieve meshing of the infeed portions while maintaining independent separator portions. In the embodiment of FIG. 7 the fingers of feed portion 130 are longer than those of the separator portion 132 so that the effective diameter is greater resulting in an infeed portion cross section similar to that of FIG. 6. A suitable sheet metal transition 134 is used to bridge the step down in rotor swept diameters between the infeed portions and separator portions, 130, 132 respectively.

In the embodiment of FIG. 8, the rotor drums 70" of feed and separating portions are coaxial but, whereas in the separator portion the finger assemblies are cranked or offset downwards, the rotor feed portion finger assemblies are offset towards each other and finger length may be increased, as shown, to achieve the meshing or overlap. The total casing configuration may be similar to that of FIG. 2. That is to say the feed casing semi-cylindrical sidewall portions 50", 52" are concentric continuations of the separator cylindrical casing portions 36", 38 and the feed casing floor 54" may be tangential to them. The engagement zones of the rotor feed section and separating section fingers are indicated by the shaded areas 140 and 142, respectively.

Figures 9, 10:
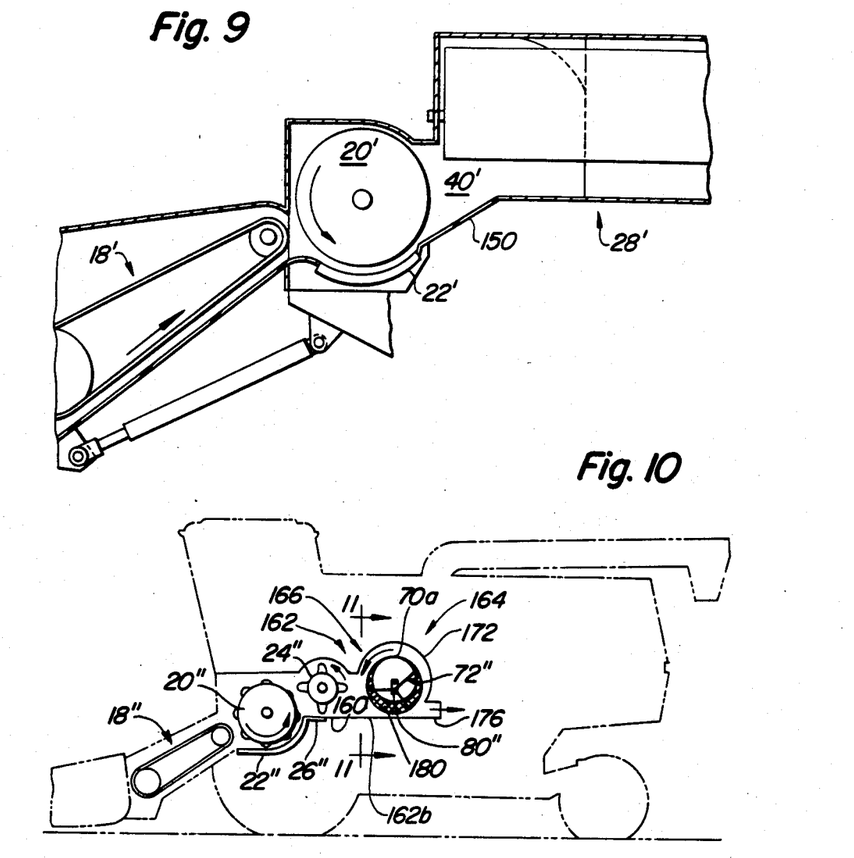
FIG. 9 is a partial side elevation of a further alternative embodiment in which a dual rotor separator infeed portion receives material undershot fashion.
FIG. 10 is a view similar to FIG. 1 of a further alternative embodiment in which a transversely disposed separator is fed tangentially.

FIG. 9 illustrates a further alternative embodiment of a feeding arrangement according to the invention in a dual cylinder separator. The vehicle is a self-propelled combine similar to that of FIG. 1 and the feed rotor configuration is substantially similar to that covered by FIGS. 1–5 except that it is inverted. The feeder conveyor 18' threshing cylinder and concave 20' and 22', respectively, are also similar. However, the discharge of threshed material from the cylinder is directed rearwardly and upwardly, guided in part by a ramp 150 into the inlet 40' of the infeed portion of the dual rotor separator 28'. Reception and handling of the crop material by the rotor infeed portions is then essentially similar to that described above for the embodiment of FIG. 1.

Figure 11:
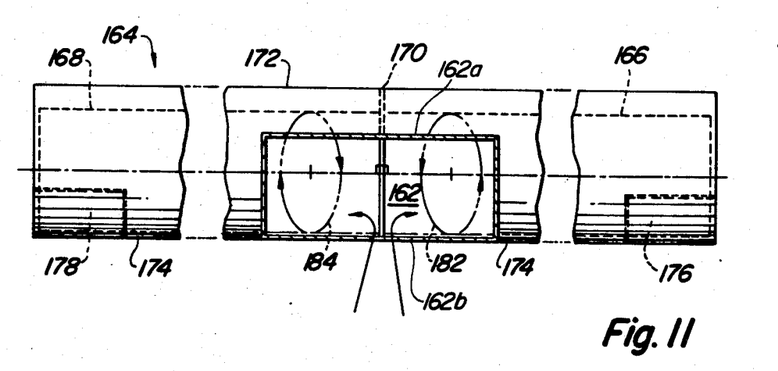
FIG. 11 is a simplified semi-schematic view taken approximately on line 11—11 of FIG. 10.

In the embodiment of FIGS. 10 and 11 the environment is again a self-propelled combine with conventional feeder conveyor 18" and cylinder and concave 20" and 22". Threshed material is delivered generally rearwardly and horizontally by a beater 24" in combination with a finger grate 26" over a feeding floor or ramp 160 to the inlet 162 of a transverse axial flow rotary separator 164. The inlet 162 has an upper edge 162a and an axially extending lower or rotationally downstream edge 162b immediately below it, connecting with the ramp 160.

As indicated in FIGS. 10 and 11 the separator 164 comprises a split flow single rotor design with the respective left- and right-hand rotor portions 166 and 168 abutting on the fore-and-aft centerline 170 of the machine and sharing the common inlet 162 into a generally cylindrical and transversely continuous and extending casing 172. Separated grain passes through foramina 174 of the casing and is collected and conveyed to a cleaning mechanism (not shown) in the drawings. The respective separator portions discharge straw rearwardly from outlets on opposite sides of the machine, 176 and 178, respectively. As indicated in FIG. 10, the cross-sectional configuration of each rotor (166, 168) is similar to that illustrated and described for the embodiment of FIGS. 1–5 and includes a cage or drum 70a concentric with the casing 172 for driving rotationally obliquely journalled finger assemblies 72". In this case the finger support shaft 80" is offset downwards so that the zone of maximum engagement (lower portion of shaded area 180) of the fingers is approximately centered on the tangent point between the conveying or infeed floor 160 and the casing 172. The plane of rotation of the fingers is substantially vertical but angled so as to immediately index received material downstream as indicated by the exemplary orbital paths 182, 184 of rotor fingertips in FIG. 11.

The single rotor embodiment of FIGS. 10 and 11 does not, of course, split an incoming stream of material in the way that the dual rotor embodiments do. However, having received the material, the rotor function in both single and dual (side-by-side) rotor embodiments is essentially similar. In the dual rotor arrangement a rotor may be said to be working against another rotor which provides a "base" or "floor" for guiding and maintaining, at least temporarily, crop material in engagement with the first rotor. In the single rotor embodiment this support and guiding function is provided by a surface such as that of the floor 160.

The embodiments described above all include rotors having elements which intermittently engage and positively spirally propel, applied to the infeed portion of a separator. The crop engaging elements (finger tip portions) are axially displaceable with respect to the rotor axis and are constrained to follow paths around the rotor axis eccentric with respect to a surrounding casing. When rotational speeds are such as to maintain the crop material in a substantially annular mat in contact with the inner wall of the casing, engagement of the elements with the mat is only intermittent (or, put in another way, the cycle includes a period of disengagement). Fingers are carried in the separator so that, while in engagement with the crop material mat, the fingers are displaced axially downstream so that in aggregate they propel the crop material spirally downstream. The mode of control or articulation of the fingers in these embodiments (and those disclosed in U.S. Pat. No. 4,408,618, Witzel) exemplify rotors operable to convey crop material spirally downstream without the assistance of auxiliary devices such as helical guide vanes carried inside the casing. But, it is noted that rotors of this general type may also be used in conjunction with axial indexing devices such as helical guide vanes.

We claim:

1. A combine harvester comprising:
   means for gathering crop material from a field and delivering at least a portion of said material in a stream in a first direction; and
   an axial flow rotary separator having a separator portion and an infeed portion upstream of the separator portion and including:
   a pair of side-by-side generally cylindrical separator portion casings each casing having an upstream inlet and a downstream outlet;
   a pair of separator rotors each having a frame, supported within a separator portion casing for rotation about an axis generally parallel to the axis of said casing, said rotors being rotatable in mutually opposite directions, each rotor having a downstream separator portion and an upstream infeed portion and being disposed so that said separator portion lies generally within the respective separator portion casing and said infeed rotor portion extends upstream of said casing;
   an infeed casing portion having walls partially surrounding the rotor infeed portions and defining a conveying space between said rotor portions and said casing walls and including a pair of opposite sidewalls partially wrapping the rotor infeed portions at the opposite outer sides of the respective rotors, each sidewall terminating in an approximately axially extending edge, the respective edges being on the same side of the pair of rotors and spaced apart so as to define approximately the lateral limits of an inlet opening, said opening being disposed in a receiving relationship with the delivered crop material stream and a generally transverse wall member extending between the sidewalls and closing the casing opposite the inlet opening; and
   means effective in the conveying space for urging material spirally downstream including generally radially extending crop material engaging elements carried by the rotor, the radial extremities of said elements defining for each rotor, as the rotor rotates, an approximately cylindrical surface of revolution and said respective surfaces of revolution being
   closely spaced so that when the rotors are rotated in directions such that, between the rotors, engaged crop material is propelled by said elements generally from the inlet towards the transverse wall member and at such speeds that crop material in the separator is maintained by centrifugal force in a mat generally in contact with the walls of the casing, the respective crop engaging elements of the side-by-side rotors and the transverse wall portion cooperate to divide the material stream into two portions and propel the respective portions downstream for ultimate reception by the respective inlets of the respective separator portion casings.

2. The combine of claim 1 wherein the means for urging material spirally includes means for articulating the crop-engaging elements relative to the rotor frame and for positioning the axis of rotation of the rotor infeed portion eccentrically with respect to the infeed casing wall portions partially surrounding it, so that the elements engage the crop material mat only intermittently and while in engagement, all of said elements move in directions such as to propel it spirally downstream.

3. The combine of claim 2 wherein the crop material engaging elements of the rotor infeed portion include generally radially extending finger-like elements journalled on the rotor frame so that as the rotor rotates, the radially outward portion of each finger moves in a generally circular path in a plane oblique to the axis of the rotor.

4. The combine harvester of claim 3 wherein the eccentricity of the axis of rotation of the rotor infeed portion is in the direction of the space between the rotors and wherein the plane of the generally circular path of the radially outward portion of the finger is such that the finger outward portion moves substantially downstream while moving towards the transverse wall member.

5. The combine of claim 2 wherein the crop material engaging elements of the rotor infeed portion further include generally axially extending paddle-like elements fixed to the rotor frame.

6. The combine of claim 1 wherein the respective axes of rotation of the rotor infeed portions are offset radially from the axes of rotation of the rotor separator portions so that the spacing of said infeed rotor axes is less than the spacing of the rotor separator portion axes.

7. The combine of claim 6 wherein the axes of rotation of the rotor infeed portions lie in the plane of the axes of the separator casings.

8. The combine of claims 6 or 1 wherein the axes of rotation of both the rotor infeed and separator portions are eccentric with respect to the respective separator portion casing axes.

9. The combine of claim 1 wherein the opposite sidewalls of the infeed casing comprise substantially partial cylindrical surfaces concentric with the casings of the separator portion.

10. The combine of claim 9 wherein said infeed casing portions have the same cylindrical diameter as the separator portion casings so that the opposite sidewalls of the infeed casing constitute a partial forward extension of the separator casing portions.

11. The combine of claim 1 wherein the width of the infeed opening is approximately equal to the lateral spacing between the axes of the separator casings.

12. The combine of claim 1 wherein the rotor separator portions also include crop material engaging elements so articulated with respect to the rotor separator portion frame that they may move axially as the rotor rotates and the disposition of the axes of rotation of the rotor separator portions is such that the elements engage the material only intermittently and the articulation is such that while in engagement, the elements propel the material generally spirally downstream.

13. The combine of claim 1 wherein the rotor separator portion also includes radially extending crop material engaging elements and the radial extent of the crop material engaging elements of the rotor infeed portion is greater than those of the rotor separator portion.

14. The combine of claim 1 wherein the inlet casing includes a upstream end wall extending generally transversely and perpendicularly to the axes of the rotors.

15. The combine harvester of claim 1 wherein between the rotors, the transverse wall member is contoured inwards.

16. The combine harvester of claim 1 wherein the inlet opening opens generally downwards and the first direction of the stream of gathered crop material is generally upwards so that the separator is fed undershot fashion.

17. The combine harvester of claim 1 wherein the inlet opening opens generally upwards and the first direction of the delivered gathered crop material is generally downwards so that the separator is fed overshot fashion.

18. A combine harvester comprising:
means for gathering crop material from a field and delivering at least a portion of said material in a stream in a first direction; and
an axial flow rotary separator having a separator portion and an infeed portion upstream of the separator portion and including:
a generally cylindrical separator casing having an upstream inlet extending at least partially axially and having an at least partially axially extending rotationally downstream edge and a downstream outlet, said inlet being in a receiving relationship with the delivered crop material stream;
a separator rotor having a frame and being supported and positioned within the separator casing for rotation about an axis generally parallel to the axis of said casing, the rotor having a downstream separator portion and an upstream infeed portion, said infeed portion registering with the inlet and including finger-like crop engaging elements each having a radially outward portion, and means for connecting the crop engaging elements to the rotor frame, the positioning of the rotor and the means for connecting the crop engaging elements being such that as the rotor is rotated, the crop engaging elements outer portion engage the crop material only during a portion of a revolution of the rotor, defining a zone of engagement, said zone being adjacent the rotationally downstream edge of the inlet and while in engagement, propel the crop material spirally downstream and away from the inlet.

19. The combine harvester of claim 18 and further including crop material guide means disposed generally tangentially to the rotor and the rotor casing and inlcuding a ramp surface aligned generally with and in a crop material transfer relationship with the rotationally downstream edge of the inlet opening and wherein the first direction of the delivered gathered stream of crop material is disposed so that said stream is received at least partially by said guide ramp and guided into generally tangential engagement with the rotor infeed portion.

20. The combine harvester of claim 19 wherein the means for gathering and delivering includes a threshing cylinder and concave in combination, said cylinder having an axis of rotation approximately parallel to the axis of the separator casing, and the threshing combination being in a delivery relationship with the ramp of the crop material guide means.

21. A combine harvester comprising:
means for gathering crop material from a field and delivering at least a portion of said material in a stream in a first direction, and
an axial flow rotary separator having a separator portion and an infeed portion upstream of the separator portion in a receiving relationship with the delivered material portion and including:
a pair of side-by-side generally cylindrical separator casings, each casing have an upstream inlet and a downstream outlet;
a pair of separator rotors each having a frame and being supported within its respective casing for rotation about an axis generally parallel to the axis of said casing, said rotors being rotatable in mutually opposite directions, each rotor having a downstream separator portion and an upstream infeed portion and said rotor infeed portions including finger-like crop material engaging elements and means for connecting said elements to the rotor frame so that as the rotor rotates, said elements engage crop material only intermittently and while in engagement, all of said elements propel crop material in a generally spirally downstream direction, the inlets of the casings being contiguous and disposed so that together they define a separator feed opening extending at least in part, axially of the rotor infeed portions and spanning, laterally, a portion of both rotors, and the disposition and first direction of the delivered crop material and the direction of rotation of the rotors being such that the delivered crop material passes through the feed inlet opening to be engaged by the crop material engaging elements of the rotor and propelled in substantially a single stream between the rotor infeed portions.

22. The combine harvester of claim 21 wherein opposite the infeed opening, the respective separator casings are joined to define a diversionary casing wall portion spanning and spaced from the zone between the respective rotor infeed portions.

23. The combine harvester of claim 21 wherein the infeed opening opens substantially upwards and the first direction of the delivered crop material is generally downwards so that the feeding of the separator is overshot.

24. The combine harvester of claim 21 wherein the axes of rotation of the respective rotor infeed portions are offset from the axes of rotation of the corresponding rotor separator portions.

25. In an axial flow rotary separator in which crop material is propelled by finger-like elements of a rotor to move in a spiral path through the generally annular space between the rotor and a casing surrounding the rotor, the rotor having a frame and the casing having an inner surface and an inlet, said inlet having an at least partially axially extending rotationally downstream side, an improved feeding arrangement characterized in that:

the rotor includes a rotor feed portion registering with the inlet and carrying a plurality of generally radially extending finger-like elements and including means for displacing downstream at least radially outward portions of the finger-like elements as the rotor rotates and in that the rotor is offset radially generally towards the inlet downstream side so that the rotor finger-like elements approach the casing inner surface adjacent said side, defining a zone of engagement adjacent said side, and the means for displacing is such that crop material delivered to the inlet is engaged by the finger-like elements and propelled through the zone of engagement in a spirally downstream direction.

26. The feeding arrangement of claim 25 further characterized in that the means for displacing downstream includes means for journalling the finger-like elements on the rotor frame for rotation in a plane oblique to the rotor axis of rotation.

* * * * *